(No Model.)
E. H. WADE.
WHIFFLETREE.
No. 283,541.
Patented Aug. 21, 1883.
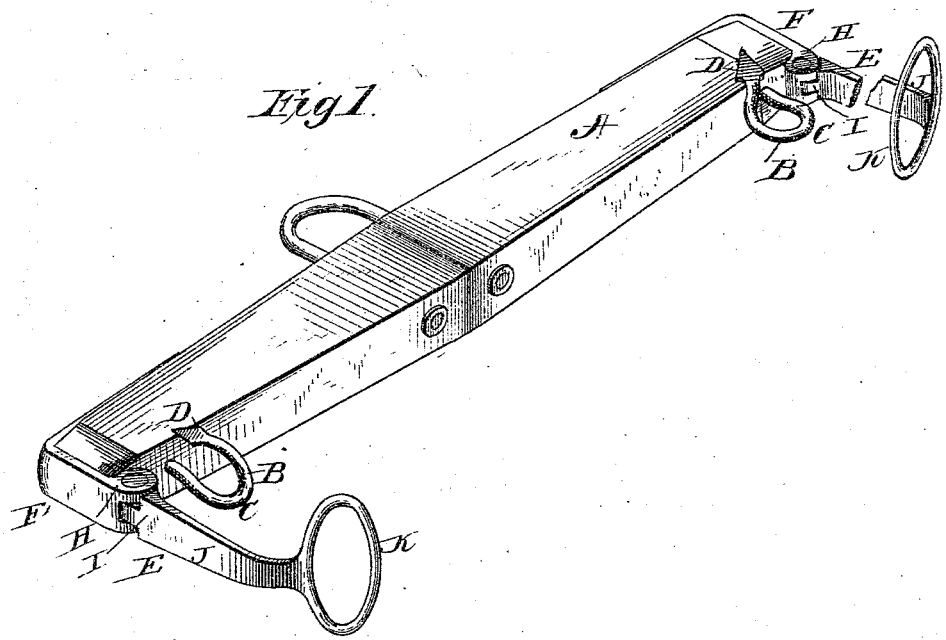
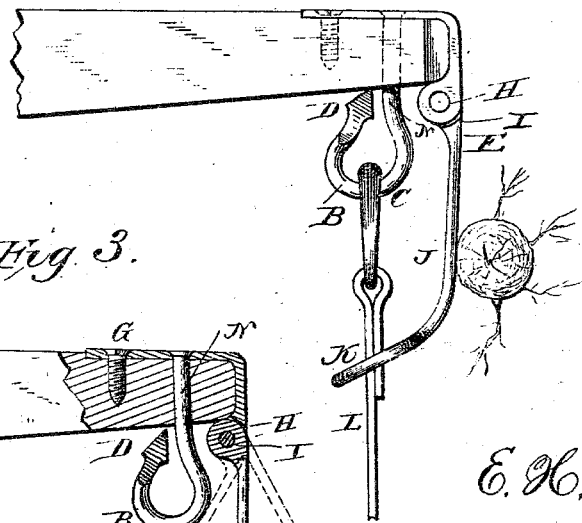
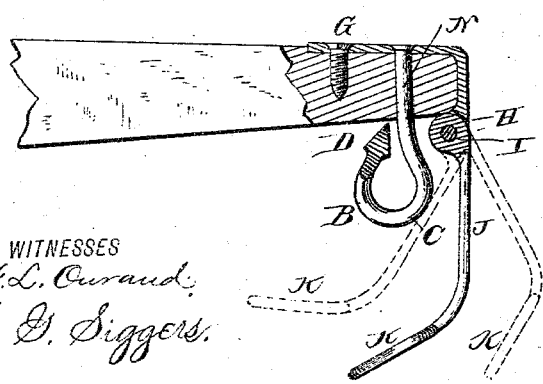
WITNESSES
F. L. Ourand
E. G. Siggers
E. H. Wade,
INVENTOR
by C. A. Snow & Co
Attorneys

UNITED STATES PATENT OFFICE.

EPHRAIM H. WADE, OF SAN JOSÉ, CALIFORNIA.

WHIFFLETREE.

SPECIFICATION forming part of Letters Patent No. 283,541, dated August 21, 1883.

Application filed June 19, 1883. (No model.)

*To all whom it may concern:*

Be it known that I, EPHRAIM H. WADE, a citizen of the United States, residing at San José, in the county of Santa Clara and State of California, have invented a new and useful Whiffletree, of which the following is a specification, reference being had to the accompanying drawings.

This invention relates to whiffletrees; and its object is to provide a simple, inexpensive, durable, and efficient device especially adapted for use in plowing, whereby engagement of the whiffletree with trees, vines, and the consequent damage and barking of the same is obviated.

In the drawings, Figure 1 is a perspective view of my improved whiffletree. Fig. 2 is a detail plan view of one of its ends, illustrating the operation. Fig. 3 is a detail sectional view of the same.

Referring to the drawings, A designates the whiffletree, which may be of ordinary construction, and is provided near each end with a hook, B, to which the harness-tug is connected. These hooks consist, preferably, of a rod curved outwardly and then around, as shown at C, and having the end D bent up.

E is my tree and vine protecting attachment, one of which is attached at each extreme end of the whiffletree. Comprised in the attachment is a right-angular securing-plate, F, that is shaped to correspond to the end of the whiffletree, and is secured around the same by bolts or screws G, or other suitable means, and has a hinge-joint, H, formed at its front projecting end. To this joint H is hinged the rear corresponding end, I, of a guard-plate, J, that projects forwardly and has its front end, K, preferably turned in, as shown, and provided with an eye, K, through which the harness-tug L passes, this eye being normally a short distance directly in front of the tug-hook B.

It will be observed that the stem N of the tug-hooks passes through the whiffletree and securing-plate, by which arrangement the said stem secures the plate to the whiffletree, this form being preferred.

The operation and advantages of my invention will be readily understood and appreciated. It will be understood that the plate J obviates the engagement of the end of the whiffletree with the tree or vine, and the outer face, M, of the plate being smooth, the passage of the same against the tree will occasion no injury to the bark thereof. In turning the plow, or when the end plate, J, engages a tree, the said plate will readily "give" inwardly by reason of its hinge-joint, so that no strain will come on the guard or protector E by action of the harness-tugs.

Under some circumstances the hinge-joint may be dispensed with and the guard-plate J be rigidly secured to the end of the whiffletree.

I claim as my invention—

1. A whiffletree provided with tug-hooks, and having guard-plates projecting forwardly from its ends, and carrying an eye portion arranged to come in front of the tug-hooks, and through which the harness-tug is adapted to pass, substantially as and for the purpose set forth.

2. The combination, with a whiffletree having the tug-hooks at its ends, of the right-angular securing-plates arranged at its ends, and the guards hinged to the front ends of the securing-plates, and having an inturned front end formed with an eye, the harness-tug being adapted to be passed through the said eye and connected with the hooks, substantially as and for the purpose set forth.

In testimony that I claim the foregoing as my own I have hereto affixed my signature in presence of two witnesses.

EPHRAIM H. WADE.

Witnesses:
J. E. WALKER,
GEORGE KENNEY.